(12) United States Patent
Jennings

(10) Patent No.: US 9,930,977 B1
(45) Date of Patent: Apr. 3, 2018

(54) PLANE PILLOW

(71) Applicant: Jeffrey Lorrin Jennings, Brattleboro, VT (US)

(72) Inventor: Jeffrey Lorrin Jennings, Brattleboro, VT (US)

( * ) Notice: Subject to any disclaimer, the term of this patent is extended or adjusted under 35 U.S.C. 154(b) by 0 days.

(21) Appl. No.: 15/421,585

(22) Filed: Feb. 1, 2017

(51) Int. Cl.
*A47G 9/10* (2006.01)
*A47C 7/38* (2006.01)

(52) U.S. Cl.
CPC ............ *A47G 9/1027* (2013.01); *A47C 7/383* (2013.01); *A47G 9/1072* (2013.01)

(58) Field of Classification Search
CPC ...................................................... A47G 9/06
USPC ..................................... 5/630, 632, 636, 640
See application file for complete search history.

(56) References Cited

U.S. PATENT DOCUMENTS

| | | | |
|---|---|---|---|
| 4,235,472 A | 11/1980 | Sparks | |
| 4,287,621 A | 9/1981 | Kertz | |
| 5,645,319 A * | 7/1997 | Parks, Jr. | A47C 7/383 297/146 |
| 5,720,061 A * | 2/1998 | Giori | A47C 20/026 5/706 |
| 6,042,185 A | 3/2000 | Cowgur | |
| 6,647,573 B2 | 11/2003 | Corbin | |
| 6,721,978 B1 | 4/2004 | Tankersley | |
| 6,973,691 B1 | 12/2005 | Cordova et al. | |
| 7,788,751 B1 | 9/2010 | Diemer et al. | |
| 8,984,688 B1 | 3/2015 | Ibrahim | |
| 2004/0064893 A1 | 4/2004 | Sharp | |
| 2013/0276236 A1* | 10/2013 | Rasmussen | A47G 9/1027 5/640 |

FOREIGN PATENT DOCUMENTS

CN 204427439 12/2014

* cited by examiner

*Primary Examiner* — Frederick C Conley
(74) *Attorney, Agent, or Firm* — Jeffrey L. Jennings

(57) ABSTRACT

An inflatable pillow, having a predetermined shape when inflated, such that the bottom face of the pillow sits securely on an airplane table tray, the pillow's back face, above the arm space, leans fully against the seat back that the table tray is mounted on, providing lateral stability for the upper region of the pillow, unique over the prior art, and an angled front face upon which the confined traveler can lean forward from their seated position and get full support for their upper torso and head so they can comfortably rest or sleep. The pillow is composed of flexible, air-retentive material and has a valve for inflating and deflating the pillow. In its deflated state the pillow is compact enough to fit in most carry-on bags for ease of transport and storage. A simple bellows is provided with the pillow for inflating the pillow. An arm space is provided behind the pillow along the table tray for the users forearms to be folded there, allowing the user to lean onto the front face of the pillow and hug the pillow, providing physical and psychological security for the passenger.

6 Claims, 7 Drawing Sheets

PLANE PILLOW

CROSS REFERENCE TO RELATED APPLICATION

This application claims the benefit of provisional patent application Ser. No. 62/388,662, filed 2016, Feb. 4 by the present inventor.

FEDERALLY SPONSORED RESEARCH

Not applicable

SEQUENCE LISTING OR PROGRAM

Not applicable

BACKGROUND OF THE INVENTION

Field of the Invention

The present invention relates to a device which offers a person comfort and stability while trying to rest or sleep in an upright forward leaning seated position. More specifically the invention is a device which would support the upper torso and head of a forward leaning resting sleeping person.

DISCUSSION OF PRIOR ART

It is common knowledge to persons travelling in commercial aircraft that it is difficult if not impossible for a passenger to get comfortable enough to rest or sleep. The seat backs do not recline enough for a person to sleep, and one's head is supported only from the back.

Over the years there have been numerous attempts to come up with a solution to this problem. Small "C" shaped and oval shaped stuffed pillows can be purchased at most airports, but they are small and only helpful for the passenger seated in the window seat. There are more advanced designs found in the prior art, which offer more comfort for a confined passenger, but none are as simple, stable, and comfortable as that of the present invention, as will be demonstrated herein.

U.S. Pat. No. 5,645,319 (Parks) presents an inflatable pillow which sits on the table tray of a commercial airplane. Parks' device is intended and specified in drawings and claims to support just the head of the user. Parks' device offers no support for the upper torso of the user, nor for the user's arms. A person cannot rest or sleep in an upright seated position with just their head supported.

Parks' device is multi chambered with internal sealed partitions, made with "air flow communication" openings, which makes his device costly to manufacture, hence costly for the consumer. Another drawback to Parks' device are his two methods of inflating his device; one is with the user's own lung power, too strenuous for most people, and the second is with the air vent above the passenger's seat. But these air vents do not produce enough air pressure to inflate Parks' multi chambered device.

One of Parks' main design features is the "sculpted back" of his device; designed to allow the seat back to recline without disturbing his device, but when the seat back reclines the table tray and the device move some anyway. And the "sculpted back" makes the entire upper portion of Parks' device freestanding and hence unstable.

Parks also puts forth two completely different devices in his patent and Parks states that his preferred embodiment can be manipulated into his secondary embodiment; physically impossible.

U.S. Pat. No. 6,042,185 (Cowger) discloses an inflatable rectangular device that sits on the user's lap. Cowger's device has a flat top for receiving the head of the user, but the top, being flat and horizontal forces the user to lean over at an unnatural, uncomfortable 90° angle to get any support from Cowger's device.

U.S. Pat. No. 6,647,573 (Corbin) discloses an inflatable device designed to support just the head of the user. There is no consideration for the support of the upper torso. Another drawback to Corbin's design is that it requires the use of an additional pillow to sit on top of his device for his device to be functional.

U.S. 2004/0064893 (Sharp) presents an inflatable device which sits on the lap if the user, and is intended to support just the head of the user. No means are offered to support the upper torso of the user. Another drawback of Sharp's device is its rounded shape, which does not offer any stability for a resting passenger.

U.S. Pat. No. 6,973,691 (Cordova et al.) discloses a head and neck support pillow that fits between the lap and the chin of the user. Cordova's preferred embodiment is a solid foam pillow. This device being solid makes transporting and storing it awkward. Another drawback of Cordova's device is its limit to address different height users. An extra block is recommended is this patent, which adds to the awkward transportation and storage of Cordova's device. Cordova's device also lacks lateral stability.

U.S. Pat. No. 7,788,751 (Diemer et al.) discloses a "sitting neck support device" which sits on the lap of the user to support just the head of the user. The stability of Diemer's device is questionable in that there Is no lateral support. As with other patents listed here there is no support offered for the upper torso of the user.

U.S. Pat. No. 8,984,688 (Ibrahim) discloses a complicated device which features multiple chambers and multiple openings. Because of the complexity, the manufacturing cost would be extremely high, making the end cost to consumers prohibitive. Another drawback is that Ibrahim's device sits on the lap of the user offering no lateral support.

SUMMARY

It has been shown that nothing in the prior art adequately solves the problem of finding comfort and stability, while in the confines of economy air travel. It is the principle object of the present invention to provide a comfortable, stable, inflatable pillow to fully support the upper torso and head of a user while the user is in a forward leaning seated position. It should be noted that most of the prior art devices support only the head of the user.

It is a particular advantage of the present invention to provide an inflatable pillow whose specific predetermined shape when inflated, is it's advantage; and is such that it's flat bottom sits securely on the horizontal table tray of an airplane, it's upper back face leans fully against the seat back holding the tray, providing stability to the upper region of the pillow, unique over the prior art, leaving it's angled front face open to receive the full upper torso and head of the user.

It is an advantage of the present invention to provide lateral stability for the user by designating, in that predetermined shape, a space behind the pillow for the user to fold his or her forearms. In this position the user is hugging the pillow providing both physical and psychological security.

A further advantage of the present invention is its simplicity. The pillow presented here is one single airtight chamber, with no internal partitions. Easy and inexpensive to manufacture. Yet a further advantage of the present invention is its ability to deflate. When deflated the pillow folds to a compact size able to fit in most carry-on bags.

Another advantage of the present invention over the prior art is its method of inflation, which is by means of a foot (or hand) pumped bellows (not shown) equipped with an air hose and a nozzle to fit the valve on the pillow.

Further objects and advantages of the present invention may become apparent from consideration of the drawings and detailed description.

DETAILED DESCRIPTION OF THE PRESENT INVENTION

The inflatable pillow of the present invention is fabricated of a flexible, air retentive material such as, vinyl, sheet rubber, sheet plastic, or any such material which would be flexible and air retentive.

Figure 1:
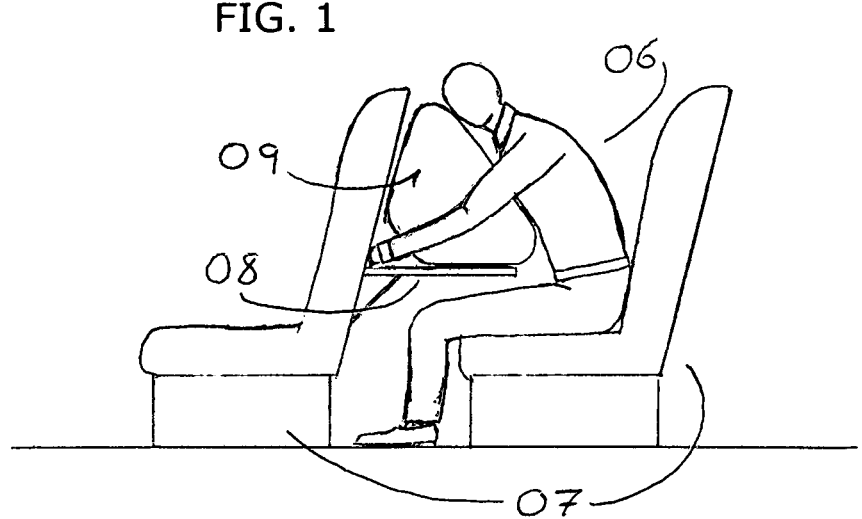
FIG. 1 is a side view of a person in a set of seats leaning his or her upper torso and head onto the inflated pillow of the present invention.
Figure 2:
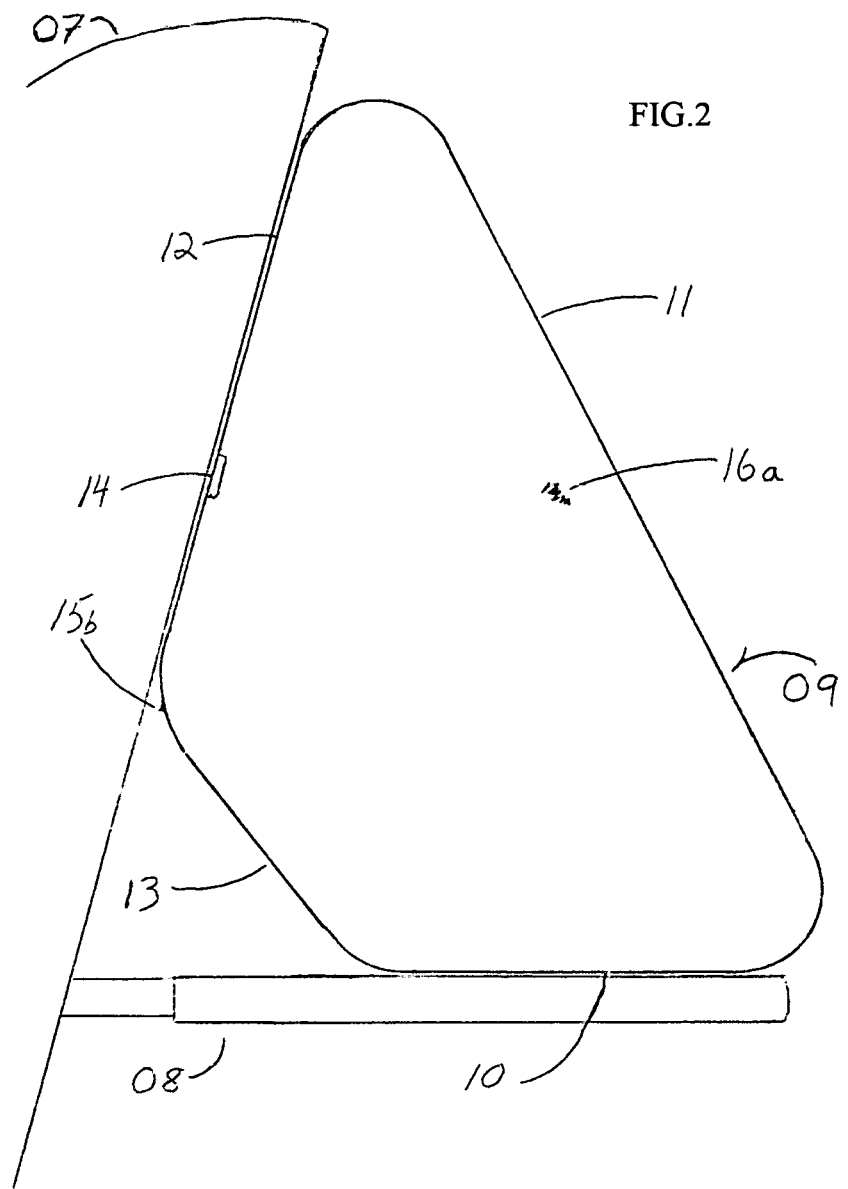
FIG. 2 is a more definitive side view of the pillow.
Figure 3:
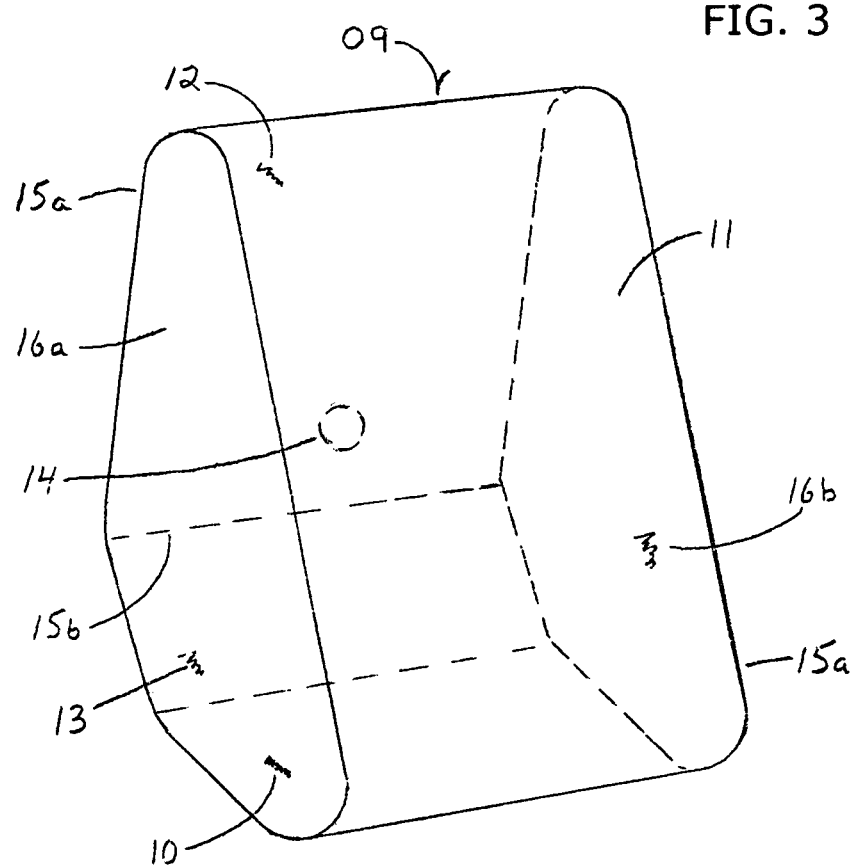
FIG. 3 is an isometric illustration of the pillow, showing its predetermined three dimensional shape.

The inflatable pillow 09 presented here in FIGS. 1,2, and 3 is one single airtight chamber. It is contemplated that internal baffles are unnecessary in an inflatable pillow the size that would fit on an airplane table tray.

It is seen in the isometric illustration of the inflated pillow, FIG. 3, that the pillow is fabricated of three pieces of material, two side panels 16*a* and 16*b* and a middle piece of material making up faces 10,11,12, and 13. The middle piece of material being about the width of an average adults chest, between the armpits. The middle piece of material is one continuous face 10,11,12, and 13, starting at seam 15*b* and ending at seam 15*b*, on back face 12 of the pillow, or at any suitable location. As can be seen in FIG. 3, the long sides of the middle piece of material are wrapped around the perimeter of the two side panels 16*a* and 16*b* and its edges are sealed to the perimeter of the two side panels 16*a* and 16*b*. The ends of the middle piece of material are sealed to each other at seam 15*b* to provide an airtight chamber. FIG. 3 further shows air valve 14 provided on back face 12 for inflating and deflating the pillow. Not shown is a bellows provided with the pillow. The bellows being equipped with an air hose and a nozzle adapted to fit valve 14 for inflating the pillow.

Figure 4:
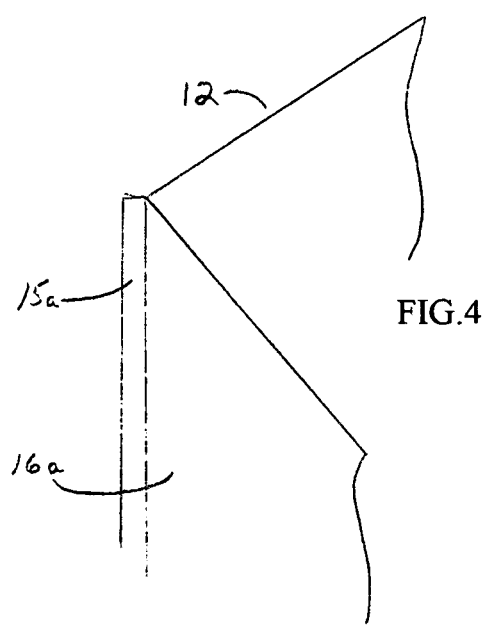
FIG. 4 shows a possible seam configuration.

A cross section of a seam configuration is shown in FIG. 4, where back face 12 is sealed to side panel 16*a* by seam 15*a*. Seams 15*a* and 15*b* are sealed by any number of means including; heat, adhesive, RF sealing or any other suitable means to ensure an airtight chamber.

In its inflated state, it is the specific predetermined shape of pillow 09 which is its structure, wherein bottom face 10 sits securely on table tray 08, the back face 12 (above the arm space) leans fully against the back of seat 07, providing stability for the upper region on the pillow, allowing front face 11 to receive the upper torso and head of the user. Lower back face 13 angles inward to provide space for the users forearms to be folded behind the pillow.

FIG. 1 is a side view of pillow 09 in use by passenger 06 and shows the stability of the pillow provided by its specific inflated shape, its structure. The pillow is wedged between table tray 08, seat back 07, and passenger 06. It is stable. It cannot topple over as can several of the devices found in the prior art.

In use inflatable pillow 09 described herein is simple; drop table tray 08 down to its horizontal position, take the pillow from a carry-on bag, unroll or unfold the pillow onto table tray 08, insert the nozzle from the bellows into valve 14 and inflate the pillow to one's desired firmness. Stowe the pump away and position the pillow on table tray 08, with back face 12 against seat back 07, which is holding table tray 08. The user would then lean forward placing his or her upper torso and head against front face 11 of the pillow to rest or sleep. The comfort of leaning one's full upper torso and head onto the soft, angled front face of the pillow and hugging the pillow with arms around behind the pillow will provide physical and psychological security for the passenger.

Hence inflatable pillow 09 solves the problem of finding comfort and security in that confined space far more effectively than anything found in the prior art.

Figure 5:
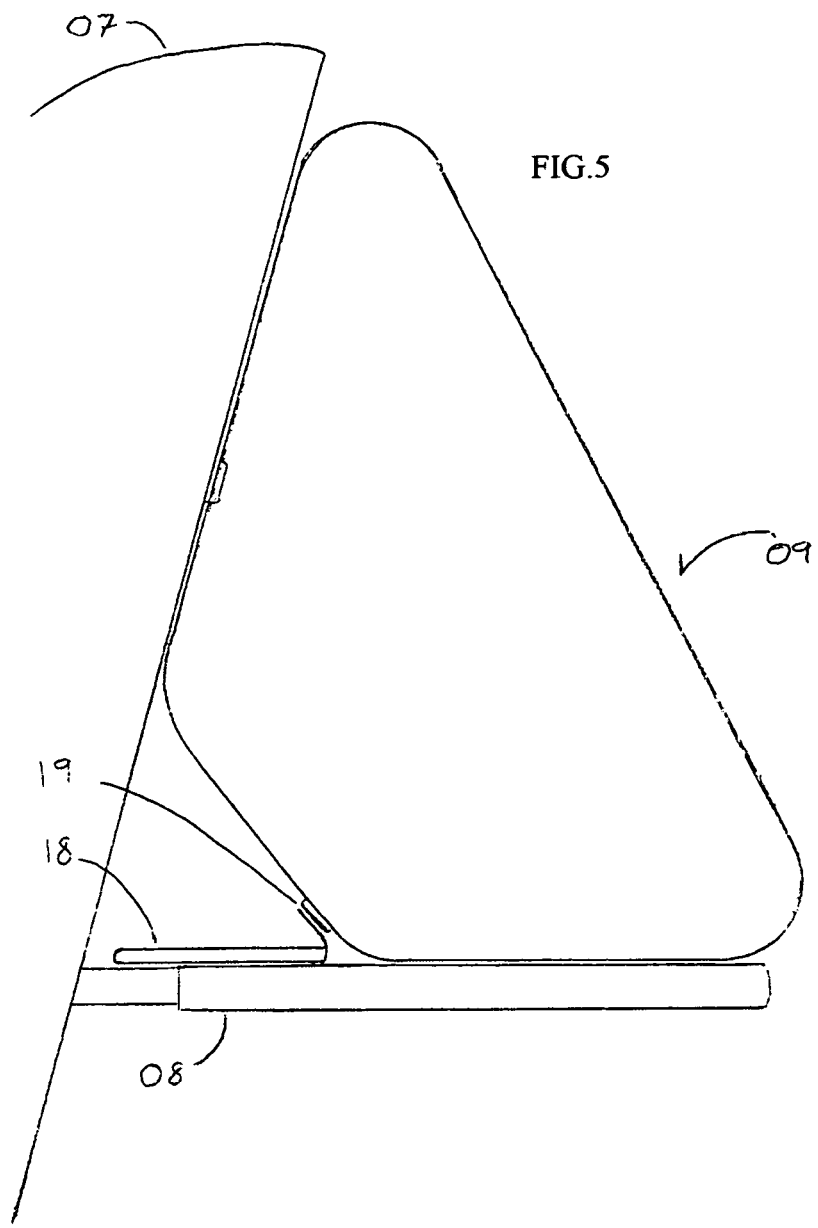
FIG. 5 is a side view of the pillow with optional arm pad.
Figure 6:
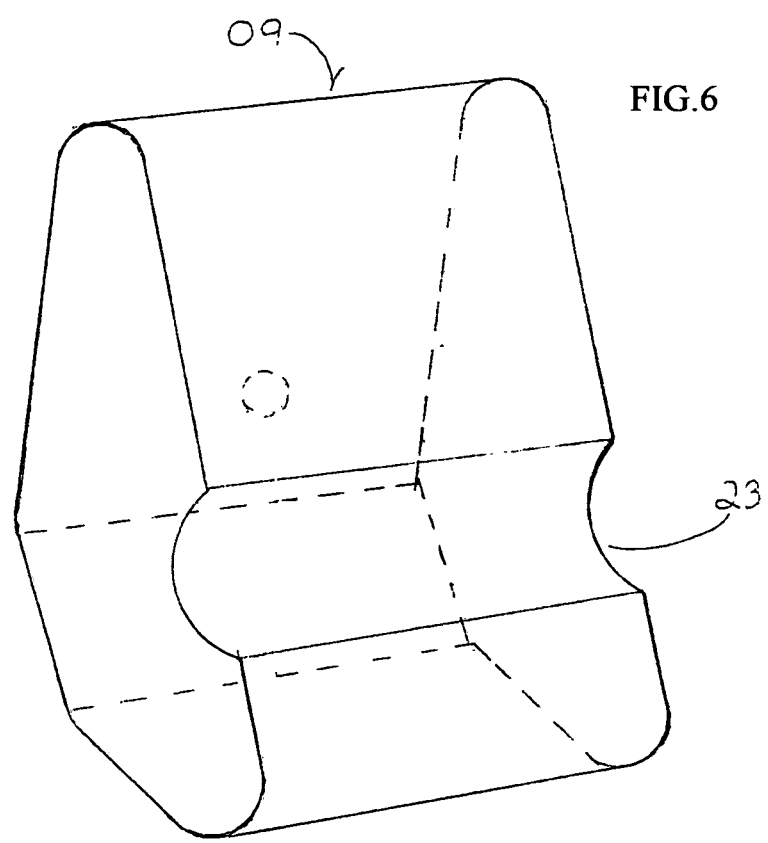
FIG. 6 shows the breast pocket option.
Figure 7:
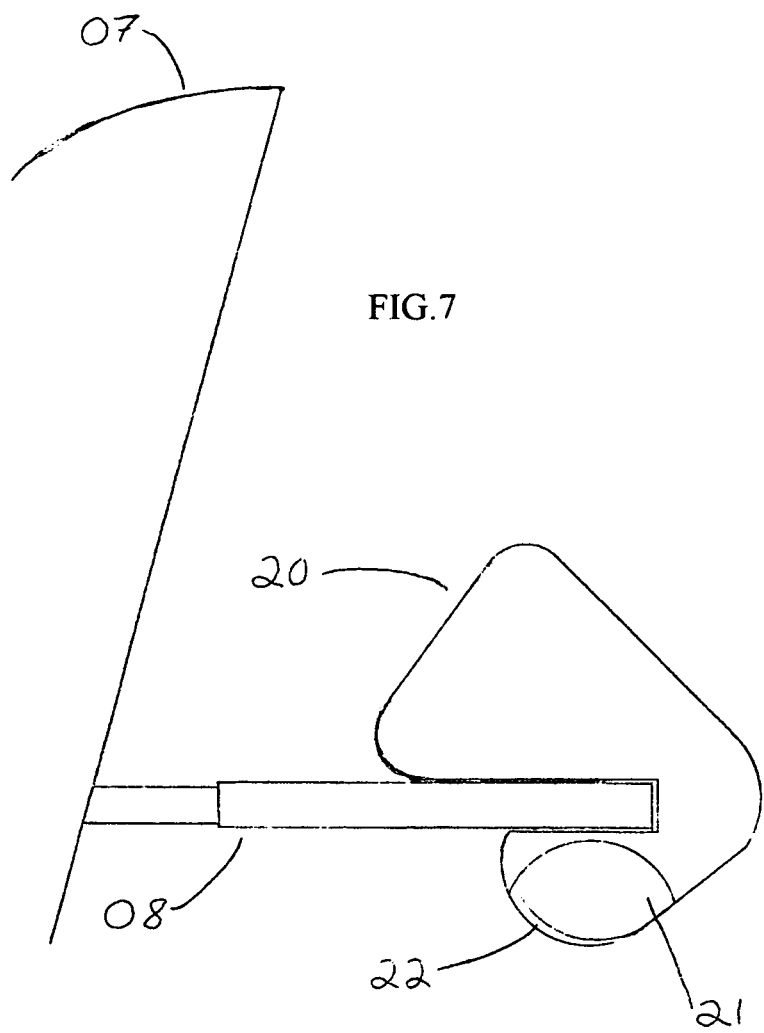
FIG. 7 shows the child size pillow.

Alternative embodiments of pillow 09 are shown in FIGS. 5,6, and 7. FIG. 5 is a side view of pillow 09 with optional arm pad 18 in the space provided behind the pillow for the users forearms. Arm pad 18 is attached to back face 13 of the pillow by hook and loop strips 19 or any suitable means. Arm pad 18 is provided for the support and comfort of the user's forearms.

FIG. 6 is an isometric illustration of pillow 09 wherein the front of the pillow is configured to accommodate the breasts of female users in breast pocket 23.

FIG. 7 is a side view of the offspring of pillow 09; child size pillow 20, which has a similar yet smaller profile as pillow 09, and which overhangs and wraps around the front edge of table tray 08, providing cushioning for a child's chest when the child leans forward against the pillow. Child pillow 20 also has an arm sleeve 21 running laterally through the section of child pillow 20 which is under the front edge of table tray 08, as seen In FIG. 7. The arm sleeve 21 is adjustable in size by overlapping sides 22 equipped with hook and loop fasteners or any other suitable fasteners.

While a preferred embodiment of the present invention has been shown and described in detail it will be understood by those skilled in the art, that alterations and modifications are possible without departing from the scope and essence of the invention which is here set forth in the claims.

DRAWING NUMBERS REFERENCE CHART

06 Passenger
07 Airplane seats
08 Airplane table tray
09 Plane Pillow
10 Bottom face
11 Front face
12 Back face
13 Lower back face
14 Air valve
15*a*+*b* Seams
16*a*+*b* Sides 17 no part
18 Optional arm pad
19 Hook and loop fasteners or other
20 Child Plane Pillow
21 Arm sleeve
22 Adjustable overlapping sides
23 Breast pocket

What I claim is:

1. A resting device to facilitate a person's resting or sleeping in a forward leaning, seated position, comprising:

an inflatable, flexible, airtight chamber, said inflatable airtight chamber being one single compartment and having a predetermined three dimensional shape when inflated, said inflatable chamber being composed of flexible, air-retentive material, said material being sealed together by means suitable to ensure an airtight chamber, said inflatable airtight chamber having valve means for inflating and deflating said chamber, said inflatable chamber further being configured, to have an arm space provided laterally across the lower back of said inflated chamber, such that a user is able to embrace said inflated chamber, said predetermined shape of said inflated chamber is such that said inflated chamber fills a space on top of an airplane table tray and behind a seat back holding said table tray, such that a bottom face of said inflated chamber sits flat on said table tray, a back face, above the arm space of said inflated chamber, being in full contact with said seat back, providing lateral stability to the upper region of the inflated chamber, and an angled front face, whereby, said angled front face of said inflated chamber is positioned for receiving an upper torso and a head of the user leaning forward onto said inflated chamber, said inflatable airtight chamber further including a small bellows, an air hose, and a nozzle adapted to fit the inflation valve on said inflatable chamber.

2. The resting device as defined in claim 1, further comprising;

an arm support pad configured along said arm space of said inflated chamber, such that when the user embraces said inflated chamber their forearms rest on said arm support pad, said arm support pad composed of rigid or semi rigid material covered at least on it's top surface, with padding suitable to provide a comfortable surface for the user's forearms to rest on, said arm support pad further having attachment means, such as hook and loop fasteners, for attachment and detachment of said arm support pad to and from said arm space of said inflated chamber.

3. A resting device to facilitate a child's resting or sleeping in a forward leaning seated position, comprising;

a child's inflatable, flexible, airtight chamber, said child's inflatable chamber being one single compartment and having a predetermined three dimensional shape when inflated, said child's inflatable chamber being composed of flexible, air-retentive material, said material being sealed together by means suitable to ensure an airtight chamber, said child's inflatable chamber having valve means for inflating and deflating said chamber, said predetermined shape of said child's inflatable chamber is such that the majority of the volume of said child's inflated chamber sits on top of an airplane table tray, yet the child's inflatable chamber also envelopes a front edge of said table tray, providing a cushion over said front edge of said table tray, thereby protecting a child's chest from said front edge of said table tray when the child leans forward to rest or sleep, said child's inflatable chamber being equipped with a bellows, an air hose, and a nozzle adapted to fit the inflation valve on said inflatable chamber.

4. The child's resting devise as defined in claim 3, further comprising;

an open tubular channel laterally through the section of the inflated chamber which is configured under the front edge of said table tray, providing a sling to support the child's forearms, said tubular channel having overlapping sides, said overlapping sides having adjustable means for attachment to each other, providing adjustment in size of said sling.

5. An inflatable devise for supporting an upper torso and a head of a user leaning forward in a seated position to rest or sleep, comprising;

an inflatable, flexible, airtight chamber, the inflatable chamber being one single compartment, the inflatable airtight chamber being composed of a flexible, air impervious material, the material sealed together by means suitable to ensure an air tight chamber, the inflatable chamber having valve means for inflating and deflating the chamber, the inflatable airtight chamber having a predetermined three dimensional shape when inflated, the predetermined shape of the inflated chamber is such that a bottom face sits on a horizontal support system, an upper back face abuts a vertical restraint, providing lateral stability to the upper region of the inflated chamber, while a front angled face is available to receive the upper torso and the head of the user leaning forward from a seated position onto the inflated chamber, the inflatable chamber further being configured laterally across the lower back to provide for an arm space, such that the user could embrace the inflated chamber, the inflatable chamber further equipped with a bellows, an air hose, and a nozzle to mate with the inflation valve on the inflatable chamber.

6. The resting devise as defined in claim 5, further comprising;

an arm support pad, the arm support pad composed of rigid or semi-rigid material and covered with a suitable padding, the arm support pad configured along and in the arm space, providing a floor in the arm space, and attachment means suitable to attach the arm pad to the arm space, such that when the user embraces the inflated chamber their forearms rest on the arm support pad.

* * * * *